J. D. ALLEN & J. A. CONLY.
MECHANISM FOR CONTROLLING POWER TRANSMISSION ELEMENTS.
APPLICATION FILED MAY 18, 1907.
914,374.
Patented Mar. 9, 1909.
3 SHEETS—SHEET 3.
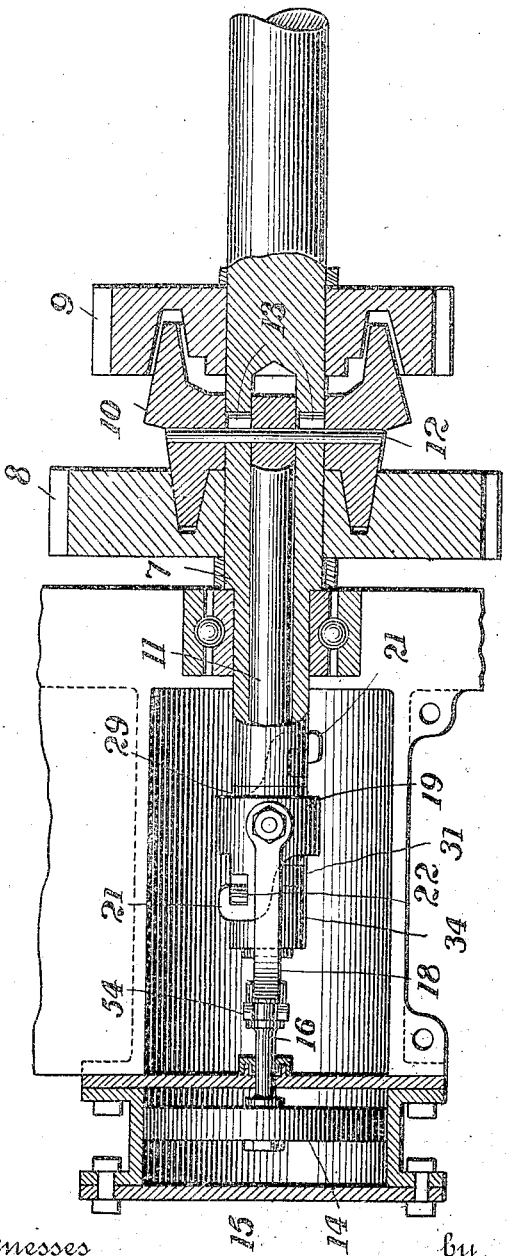
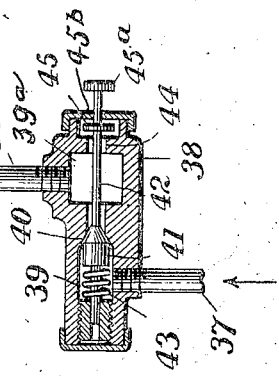
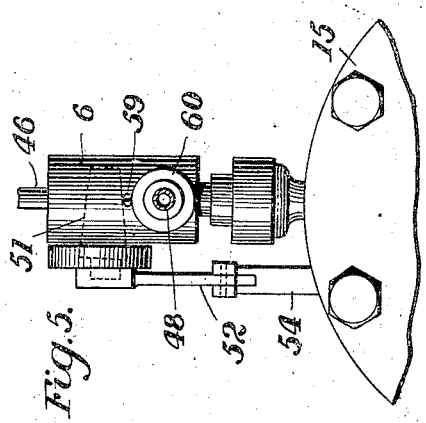
Inventors
John D. Allen,
John A. Conly,
Howard Coombs
Their Attorneys

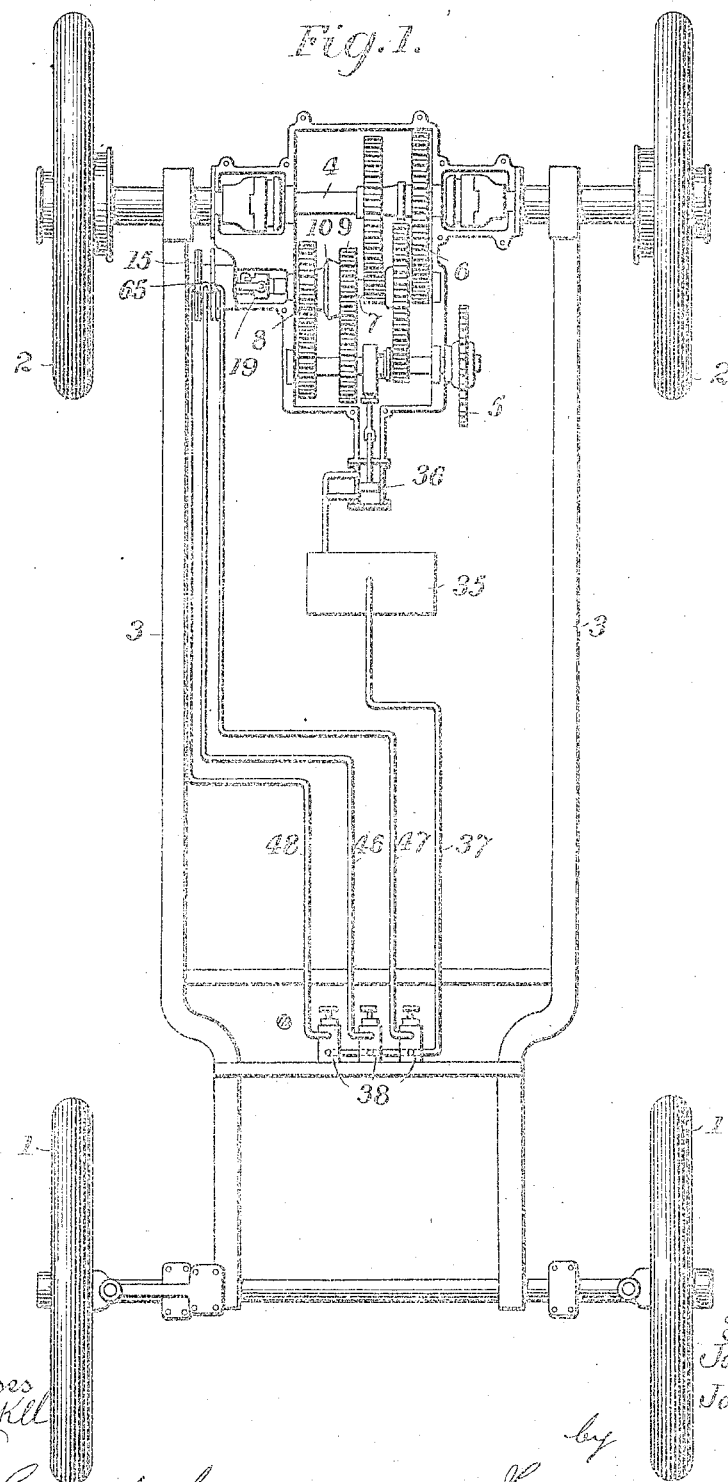

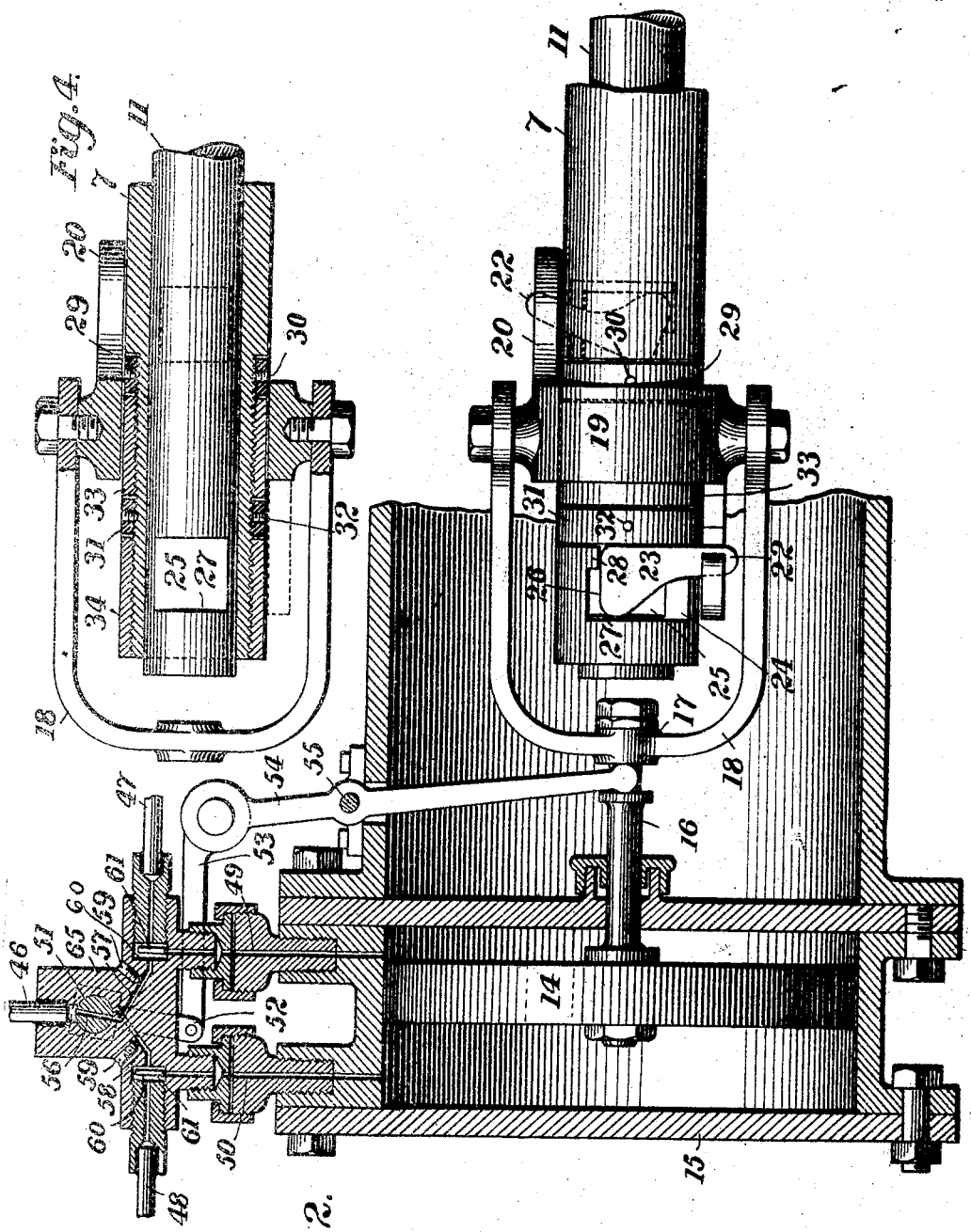

UNITED STATES PATENT OFFICE.

JOHN D. ALLEN AND JOHN A. CONLY, OF PHILADELPHIA, PENNSYLVANIA.

MECHANISM FOR CONTROLLING POWER-TRANSMISSION ELEMENTS.

No. 914,374.　　　Specification of Letters Patent.　　　Patented March 9, 1909.

Application filed May 18, 1907. Serial No. 374,475.

*To all whom it may concern:*

Be it known that we, JOHN D. ALLEN and JOHN A. CONLY, citizens of the United States, and residing at Philadelphia, in the county of Philadelphia and State of Pennsylvania, have invented new and useful Improvements in Mechanism for Controlling Power-Transmission Elements, of which the following is a specification.

Our invention relates to improvements in mechanism for controlling power-transmission elements, by means of which a clutch, or an equivalent power-transmission-controlling means, can be moved into either of two extreme positions, or into an intermediate position, and be securely locked in any one of said positions.

A further object of our invention is to provide pneumatic mechanism for actuating the said clutch, or the like, said pneumatic mechanism being manually controlled from any convenient location to move the clutch, or other power-transmission controlling means in either direction into an extreme position or into an intermediate position.

Our invention is more particularly designed for controlling the position of a clutch, between two of the gears forming part of the driving train of an automobile, and is illustrated and described herein in that connection, but, as will be obvious, it is not confined to such use, but is applicable to any power-transmission controlling mechanism, wherein a transmitting or controlling element has to be shifted into two or more positions.

As illustrated in the accompanying drawings, our invention is applied to the shifting of a clutch carried by a rotating shaft, but, while advantageously used in such connection, it is equally applicable for use where the power-transmission element does not rotate.

Figure 1 is a plan view of the running-gear of an automobile equipped with our invention; Fig. 2 is a plan view of the clutch-actuating means, the pneumatic mechanism being mainly shown in section; Fig. 3 is a longitudinal section through the shaft, the clutch and its gears, and the pneumatic cylinder, the connections between the piston and the clutch being shown in elevation; Fig. 4 is a longitudinal section through the parts of the clutch-actuating means; Fig. 5 is an elevation of a portion of the pneumatic cylinder and its valve-chest, and, Fig. 6 is a section through one of the manually-operated valves, by which the admission of air to the pneumatic-cylinder is controlled.

Referring first to Fig. 1, there is shown at 1, 1, the front wheels of an automobile and at 2, 2, the rear, driving wheels, the axes of said wheels being connected by the frame 3. The driving-shaft 4 of the rear wheels is driven from a motor, not shown, through the sprocket-wheel 5 and the change-gearing, indicated in a general way by the numeral 6. This gearing includes an intermediate shaft 7, carrying the two loose gears 8 and 9. Slidably mounted on the shaft between said gears is the clutch 10, shown in section in Fig. 3, which is connected to a rod 11, slidably mounted in a bore in the end of the shaft, by a pin 12, passing through slots 13 in said shaft. The means for moving the rod 11 in the bore of the shaft 7, to cause the clutch 10, which is shown as having conical friction surfaces adapted to engage conjugate surfaces in the gears 8 and 9, into engagement with either gear or into an intermediate position, comprise a piston 14, contained in a cylinder 15, and having its rod 16 swiveled at 17 to a yoke 18, the arms of which are bolted to a collar 19, slidably mounted on shaft 7; said collar carries a pair of oppositely projecting arms 20, extending longitudinally of the shaft, and provided with hooks 21 at their ends, which engage around the tails 22 of a pair of dogs 23 seated in slots 24, formed in said shaft, and in grooves 25, formed in the rod 11. By moving the collar 19 along the shaft 7, said dogs are rocked, which results in their forcing the rod 11 longitudinally within said shaft and locking it in any position, as will now be further explained. The dogs 23 face in opposite directions and rock on two oppositely-facing surfaces on the rod 11,—formed by one side of each slot 24,—while the toes 26 of the dogs bear against the corresponding oppositely-facing shoulders 27,—formed by one side of each groove 25. As illustrated, the dogs are placed back to back, and the shaft-surfaces, on which the dogs rock, lie inside the shoulders on the rod 11, against which they exert their leverage when rocked to move said rod, but, of course, this arrangement might be reversed, the dogs facing inwardly and the positions of the bearing surfaces on the shaft and rod being relatively interchanged. The distance apart of the two shoulders 27, and between the adjacent edges of the slots 24 is so chosen that when the toe of one of the dogs lies parallel with the axis of the shaft, the toe of the other must be inclined; that is to say, the distance between the shoulders 27 is not enough to permit both dogs to stand straight at the same time, said distance being less than the distance between the adjacent edges of the slots 24, plus the combined lengths of the toes of the dog when parallel to the axis of the shaft, by the amount which it is necessary to move the clutch from one extreme position to the other.

In the position shown in Fig. 2, the rod 11 has been moved by the dog 26 to the extreme left-hand position and the clutch is in engagement with the left-hand gear 8, Fig. 3. If the clutch is to be thrown clear over, the rocking of the dogs will, of course, be continued until the right-hand one has reached the straight position in which the other is shown in Fig. 2, and vice-versa, but if the clutch is to be disengaged from both gears, the collar 19 is only moved far enough to leave both dogs in partially-tilted positions; but wherever they may be left, the rod is positively locked against longitudinal movement, except when the collar is shifted, as will be obvious. The leverage obtained by the dogs is very strong and but slight force is required to shift the collar and rock the dogs to actuate the clutch. In order to prevent the dogs from falling out, the slots 24 in the hollow shaft 7 are not carried through of uniform width, but a shoulder 28 is left in each slot, against which the end of the dog bears.

Since the clutch-surfaces are necessarily subject to wear, we provide the following means for adjusting the bearing surfaces at the sides of the slots 24 in the shaft, which serve as fulcrums for the dogs, see Fig. 4. The shaft 7 is reduced in diameter from a point within the outer edge of the inner of the two slots 25, and is threaded to receive a collar 29, which constitutes the bearing-shoulder for the right-hand dog. Said collar can be secured in its adjusted position by a set-screw 30. A similar collar 31, threaded on the said reduced portion of the shaft, forms the bearing surface for the other dog, and is secured in adjusted position by set screw 32. Between said collars, a sleeve 33, which supports the collar 19, is threaded on the shaft, and outside the collar 31, another sleeve 34 is threaded on, said collars 29 and 31 and sleeves 33 and 34 being all of the same diameter as the unreduced portion of the shaft 7. In this way, the surfaces appertaining to the said shaft, which act as fulcrum surfaces for the toes of the dogs while they are acting on the shoulders 27 of the rod 11, can be adjusted as found necessary.

We come now to the means whereby the piston 14 is controlled, that is to say, whereby the air-pressure is admitted on either side thereof to move it into either extreme position or into the central position. In the first place, a reservoir of compressed air 35 is provided, the same being supplied, in the present embodiment of our invention, by a pump 36, driven from the primary shaft which carries the sprocket-wheel 5. Means are provided to keep the pressure in the reservoir or tank 35 approximately constant, but, since said means form no part of our present invention, no description thereof is necessary. From said tank a pipe 37 leads to three valve-casings 38, arranged, when our invention is applied to an automobile, on the dash-board of the vehicle or at some point convenient to the driver's seat. As each of said three valve-casings is identical in construction, a description of one of them will suffice, reference being now had to Fig. 6. The valve-casing 38 comprises a chamber 39, into which the said air-inlet pipe 37 leads, and having a valve-seat 40, with which coacts a valve 41, having a stem 42, suitably guided in the casing and surrounded by a spring 43, tending to keep said valve on its seat. On the other side of said valve-seat, said stem passes through a chamber $39^a$, from which leads an outlet pipe, as 46, and provided with an exterior valve-seat 44, with which coacts a valve 45, carried by said stem, which also carries at its end a button $45^a$ outside said casing. When the button is pushed in, the valve 45 is closed and valve 41 is lifted from its seat against the pressure of said spring, whereby air-pressure is admitted from chamber 39 past said valve 41 into chamber $39^a$, and thence through the outlet pipe 46 to the valve-chest 65 of the cylinder 15. As soon as the button is released, spring 43 closes valve 41 and opens valve 45, allowing the air to escape from pipe 46 to the atmosphere, there being suitable apertures in the cap $45^b$. While the three valve-casings 38 have or may have a common inlet pipe 37, they have separate outlet pipes, which are indicated in Figs. 1 and 2 by 46, 47 and 48, respectively.

Referring now to Fig. 2, it will be seen that the pipes 47 and 48 communicate through passages 49 and 50, respectively, with the cylinder 15, on opposite sides of the extreme positions of the piston 14, while pipe 46 communicates with either of said passages 49 or 50, through a valve 51, the stem 52 of which is connected by a link 53 to one end of a lever 54, pivoted at 55 and having its other end operatively connected to the piston-rod 16, so that said valve 51 will be turned in one direction or the other as the piston 14 is reciprocated. The valve 51 has a transverse passage 56, which is put into communication with either of two passages 57, 58, communicating through chambers 60, 60, with passages 49, 50, respectively, as said valve is turned or into an intermediate position in which it communicates with neither of said passages. Each of said chambers 60, 60 contains a patent-leather disk 61, adapted to close passages 57, 58 when pressure is admitted through pipes 47 or 48. The passages 57, 58 cross each other near the valve 51 so that the mouth of passage 57 is nearer pipe 48 and that of passage 58 is nearer pipe 47; the purpose of which arrangement will appear from the description of the operation of this mechanism which follows. Each of said passages 57, 58, is provided with a leak-screw 59, which permits the air to escape gradually when the supply is cut off.

With the arrangement of gearing for driving an automobile, illustrated in Fig. 1 and for which our invention was especially designed, the central position of the piston 14—and the corresponding neutral position of the clutch 10—corresponds to the slowest speed of the vehicle, for example five miles an hour, this position being that assumed when pressure is admitted through pipe 46, while the extreme positions of the piston 14 correspond respectively to two higher speeds, for example, 10 miles an hour and 20 miles an hour. As illustrated, the right-hand position of the piston, caused by admitting air through pipe 48, corresponds to the left-hand position of the clutch, and as the left hand gear 8 is larger than the right-hand gear 9, to the intermediate speed, while the other extreme position of the piston 14 to the left corresponds to the highest speed.

The operation of these parts is as follows:—Starting with the piston 14 in its central position, corresponding to the low speed, it can be moved in either direction, to change to the intermediate or high speed, by admitting pressure either through pipe 48 or 47. Assuming that pressure is admitted through pipe 48 to change to the intermediate speed, the button 45ª of the valve-casing from which the said intermediate speed pipe 48 leads, is pressed until the change of speed has been effected and is then released. This admits air through pipe 48 into chamber 60, and thence into passage 50, the disk 61 being thereby forced against the mouth of passage 58, closing the same. The pressure thus admitted into cylinder 15 forces the piston 14 over into the position illustrated in Fig. 2, thereby rocking the dogs and moving the rod 11 to the left, bringing the clutch into engagement with the left-hand gear 8. The button 45ª being released, the air escapes from behind the piston through the valve 45 of the corresponding valve-casing 38, leaving the piston in said position and the clutch locked in the intermediate speed. To go now onto the high speed, the button 45ª of the valve-casing 38, from which leads pipe 47, is pressed and air is admitted on the other side of the piston, moving it to its other extreme position and, consequently, the clutch into engagement with gear 9, which is the high-speed gear. When the piston is thus moved into either of its extreme positions, it turns the valve 51, through the stem 52 thereof, to put the passage through said valve into communication with one or the other of the passages 57, 58, so that by admitting air through pipe 46, the piston can be moved from either extreme position to its central position, corresponding to the low speed. When the piston is in the high-speed position, illustrated in Fig. 2, the passage 56 of low-speed valve 51 is in communication with the passage 57 leading to the chamber 60 of the intermediate-speed pipe 47 and the passage 49, and vice versa. Now, with the piston in this high-speed position, shown in Fig. 2, and that it is desired to change to the low speed; air is admitted through the low-speed valve-casing 38, pipe 46, valve-passage 56 and passage 57 to chamber 60, and disk 61 is thereby forced over against the mouth of pipe 47; the air then passes through passage 49 into the cylinder and moves the piston to the left. As the piston moves, the valve 51 is turned, shutting off the communication between its passage 56 and the passage 57. The air behind the piston then escapes through the leak-screw 59, leaving the piston in its central position. Should, however, the expansion of said air before it can escape cause the piston to move beyond its central position, such movement will cause the valve-passage 56 to be put in communication with the passage 58 leading through chamber 60 to the other side of the piston, which will arrest its further movement and cause it to assume its central position, whereupon such pressure as may remain on either side is exhausted through the leak-screws 59. It will thus be seen that, no matter in what position the piston may be, it can be moved into either of its other two positions by simply pressing on one of the buttons 45ª until the desired position, and consequently, speed of the vehicle or machine, is attained, when the button can be released until another change in speed is wanted.

It will be clear that our invention, as described above, is adapted for use wherever a power-transmission controlling element is required to be shifted, and that it provides an easy, manually-operable means for shifting such an element positively with any required degree of force and for locking it in any position to which it may be moved.

The term "clutch", as herein used in the specification and claims, is used as a generic term to cover any form of connecting-means between transmission elements, it being obvious that the mechanism described is adapted to actuate any shifting-means, whether it be a cone friction clutch, as illustrated, a tooth clutch, a belt-shipper, an electric-switch, or what not.

Having thus described our invention, and its method of operation, what we desire to claim is—

1. Mechanism for shifting a transmission element alternately in opposite directions, comprising a relatively stationary member, and a member attached to said element, said members having each a pair of oppositely facing shoulders, a pair of oppositely facing dogs, simultaneously engaging one of each of said pair of shoulders, and means to simultaneously rock said dogs in opposite directions.

2. Mechanism for shifting a transmission element alternately in opposite directions, comprising a relatively stationary member, and a member attached to said element, said members having each a pair of oppositely facing shoulders, a pair of oppositely facing dogs, simultaneously engaging one of each of said pair of shoulders, and fluid-pressure operated means to simultaneously rock said dogs in opposite directions.

3. A clutch-shifting mechanism, comprising a hollow shaft, a rod slidable therein and attached to the clutch, said shaft being slotted to form a pair of oppositely-facing shoulders and said rod having also formed thereon two oppositely-facing shoulders, one of each pair facing one of the other pair, a dog loosely mounted in each of said slots in position to bear against one side of the slot as a fulcrum and with its toe against the adjacent shoulder on the rod, and means to rock said dogs.

4. A clutch-shifting mechanism, comprising a hollow-shaft, a rod slidable therein and attached to the clutch, said shaft being slotted to form a pair of oppositely-facing shoulders and said rod having also formed thereon two oppositely-facing shoulders, one of each pair facing one of the other pair, a dog loosely mounted in each of said slots in position to bear against one side of the slot as a fulcrum and with its toe against the adjacent shoulder on the rod, and fluid-pressure operated means to rock said dogs.

5. The combination with a stationary member and a movable member, of a pair of oppositely-facing shoulders on each of said members, a pair of oppositely-facing dogs simultaneously engaging one of each of said pair of shoulders and means to simultaneously rock said dogs in opposite directions.

6. The combination with a hollow member having transverse slots, of a rod slidably mounted within said member and provided with oppositely facing shoulders, a pair of oppositely-facing dogs loosely mounted within said slots, each dog bearing against one side of each slot as a fulcrum and bearing with its toe against the oppositely-facing shoulder of said rod, and means to simultaneously rock said dogs in opposite directions.

7. The combination with a hollow member having transverse slots, of a rod slidably mounted within said member and provided with oppositely facing shoulders, a pair of oppositely-facing dogs loosely mounted within said slots, each dog bearing against one side of each slot as a fulcrum and bearing with its toe against the oppositely-facing shoulder, means to adjust the positions of said sides of said slots relatively to said member, and means to simultaneously rock said dogs in opposite directions.

8. The combination with a shaft, of a clutch slidable on said shaft, a rod slidable within said shaft and connected to said clutch, said shaft having a pair of transverse slots and a reduced end portion, and said rod having a pair of oppositely-facing transverse shoulders at a greater distance apart than that between the outer edge of the inner slot and the inner edge of the outer slot, an adjustable collar threaded on said reduced portion so as to overlap the outer edge of the inner slot, a sleeve threaded on said reduced portion behind said collar, a second adjustable collar threaded on said reduced portion behind said sleeve so as to overlap the inner edge of the outer slot, and means to shift said rod with the shaft, comprising a pair of oppositely-facing dogs mounted within said slots, each dog bearing against one of said collars as a fulcrum and bearing with its toe against the oppositely-facing shoulder of the rod, a sleeve having oppositely-projecting fingers engaging said dogs and mounted to slide on said first-mentioned sleeve, a yoke connected to said sleeve, a non-rotary rod swiveled to said yoke and means to reciprocate said rod.

9. In a clutch-shifting mechanism, the combination with a reciprocable rod, of a piston, three manually controlled valves for admitting fluid-pressure on either side of said piston to move it to its extreme positions, or alternately on both sides to move it to its central position, and means actuated by the movements of said piston and acting on said rod to move it into either extreme position or into an intermediate position, said means being constructed to lock said rod against movement in either direction except when actuated by said piston.

10. In a clutch-shifting mechanism, the combination with a cylinder provided with two admission and exhaust ports, a piston therein, a reciprocable clutch-operating member operatively connected to said piston, a manually-controlled valve connected to each of said ports, whereby fluid-pressure is admitted on one side of said piston when the corresponding valve is actuated and exhausted therefrom as soon as said valve is released, a third manually-controlled valve connected to both said ports and means actuated by the movements of the piston to control the admission of fluid-pressure from said third valve.

11. In a clutch-shifting mechanism, the combination of a cylinder, a piston therein having its rod operatively connected to the clutch, a casing connected to said cylinder and provided with two air-passages leading to said cylinder on opposite sides of the extreme positions of the piston, two chambers connected to said passages and containing automatic valves, a valve connected to move with said piston, a passage leading from said last-mentioned valve to each of said chambers, and leak-plugs leading into said two last-mentioned passages, a pressure-supply pipe leading to each of said chambers and a third pressure-supply pipe leading to said piston-operated valve, and independent manually-controlled means for admitting pressure to each of said supply pipes, whereby pressure can be admitted to said chambers to move said piston into either extreme position or into a central position.

12. In a clutch-shifting mechanism, the combination of a clutch-actuating means constructed and adapted to lock the clutch in any position, a cylinder and piston therein operatively connected to said means, two independent spring-valves which, when actuated, admit fluid under pressure to one side or the other of said piston, and, when released, allow the fluid pressure to escape, a valve connected to move with the piston to admit fluid-pressure to either side thereof, and means to control the admission of fluid-pressure to said piston-operated valve, whereby said piston can be moved and held in either extreme position or in a central position.

13. In a fluid-operated clutch-shifting mechanism, the combination of a cylinder, a piston therein operatively connected to the clutch, three independent manually-operated valves to control the movements of said piston, one of said valves admitting pressure to one side of said piston, another admitting pressure to the other side of said piston, and the third admitting pressure to either side of said piston, or to both sides alternately, so as to bring it to a central position.

14. In a fluid-operated clutch-shifting mechanism, the combination of a cylinder, a piston therein, clutch-actuating means operatively connected to said piston and constructed to lock the clutch in any position against movement except by said piston, three independent manually-operated valves to control the movements of said piston, one of said valves admitting pressure to one side of said piston, another admitting pressure to the other side of said piston, and the third admitting pressure to either side of said piston, or to both sides alternately, so as to bring it to a central position.

Signed at Philadelphia, Pa., this 11th day of May, 1907, in the presence of two witnesses.

JOHN D. ALLEN.
JOHN A. CONLY.

Witnesses:
HENRY H. FARLEY,
ARTHUR J. WILLS.